Sept. 28, 1948.　　　　N. N. O. ODEGAARD　　　　2,450,015
STEERABLE WHEEL SHOCK ABSORBER
Filed Nov. 14, 1946　　　　　　　　　　　　　2 Sheets-Sheet 1
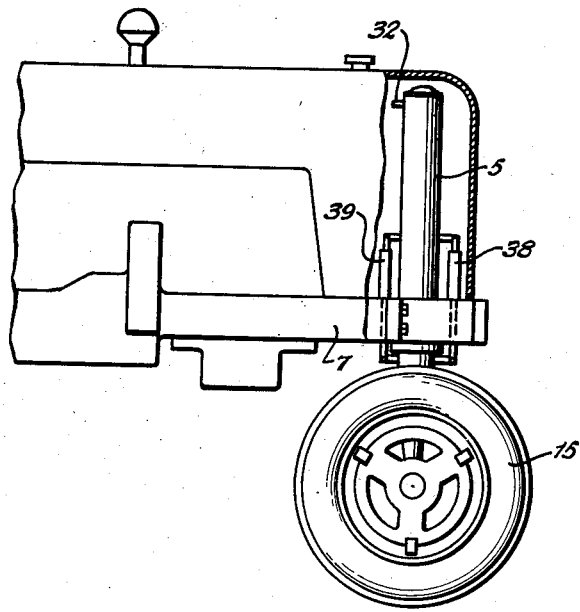
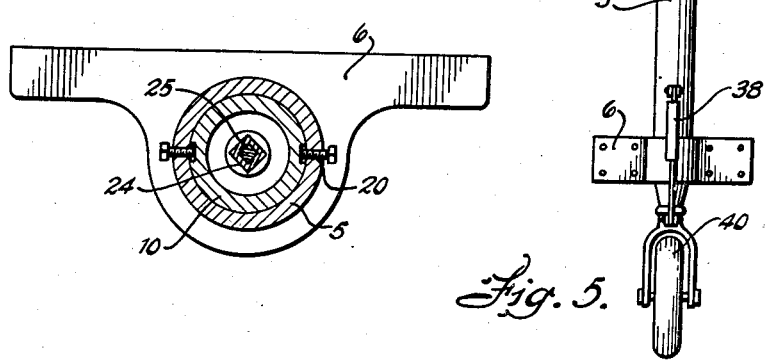
Inventor
Norman N. O. Odegaard.
By Clarence A. O'Brien
and Harvey B. Jacobson
Attorneys

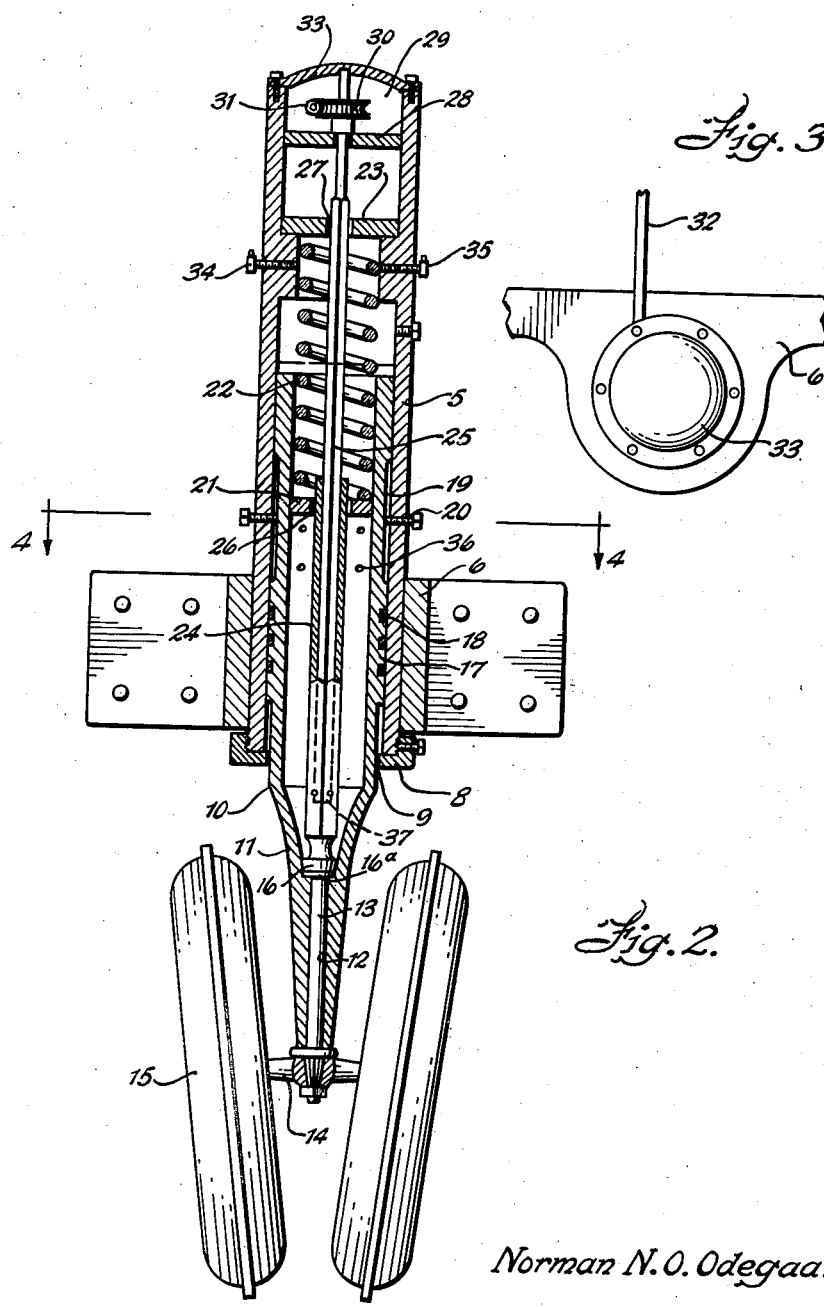

Patented Sept. 28, 1948

2,450,015

UNITED STATES PATENT OFFICE 2,450,015

STEERABLE WHEEL SHOCK ABSORBER

Norman N. O. Odegaard, McHenry, N. Dak.

Application November 14, 1946, Serial No. 709,760

1 Claim. (Cl. 280—92)

The present invention relates to new and useful improvements in shock absorbers and more particularly to a shock absorbing mechanism for the front wheels of tractors.

An important object of the present invention is to provide a shock absorbing attachment for the steering mounting of dual front wheels of a tractor whereby to improve the riding qualities of the front of the tractor and thus reduce shock subjected to the steering mechanism and to eliminate the danger of the driver being bounced out of position on the seat of the tractor while traveling over rough surfaces, such as a field while cultivating the same.

The invention is also designed to provide a smoother operation for the front wheels of the tractor to enable the more efficient use of implements mounted at the front end of the tractor.

A further object of the invention is to provide a vertically moveable shock absorbing cylinder for the dual wheel mounting at the front end of the tractor and through which the steering mechanism for the wheels is operable.

Another object is to provide an apparatus of this character of simple and practical construction, which is efficient and reliable in operation, relatively inexpensive to manufacture and install in operative position on the tractor and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view of the front end of a tractor with parts broken away and shown in section and showing the shock absorber mounted in position thereon.

Figure 2 is an enlarged vertical sectional view of the shock absorber.

Figure 3 is a top plan view thereof.

Figure 4 is a transverse sectional view taken on a line 4—4 of Figure 2, and

Figure 5 is a front elevational view of a modified type of tractor front steering wheel on which the shock absorber is mounted.

Referring now to the drawings in detail, the numeral 5 designates a vertical cylinder to the lower portion of which an attaching bracket 6 is welded or otherwise suitably secured for attaching the cylinder to the front end of a conventional form of farm tractor 7.

The lower end of the cylinder 5 is closed by a cap 8 having a central opening 9 in which a hollow piston 10 is positioned for vertical reciprocating movement in the cylinder.

The lower end of the piston tapers to form a wheel mounting 11 and which is formed with a vertical bore 12 in which a steering rod 13 is rotatably mounted, the lower end of the rod having the wheel spindles 14 suitably connected thereto and on which the dual front wheels 15 of the tractor are journalled. The rod 13 is secured against vertical movement in the mounting 11 by means of the spindle 14 at its lower end and a flange 16 on the rod and seated on a shoulder 16a in the mounting 11.

A portion of the piston adjacent its lower end is machined to provide a working fit in the cylinder 5 and said portion 17 is provided with piston or packing rings 18 to prevent leakage of oil from the upper portion of the cylinder and escape therefrom through the cap 8. The sides of the cylinder above the rings 18 are formed with a pair of vertical grooves 19 in which the inner ends of screws 20 are received to prevent rotation of the piston in the cylinder. A disc 21 is welded or otherwise suitably secured in the piston 10 adjacent its upper portion to form an abutment for the lower end of a coil spring 22 which has its upper end abutting a similar disc 23 welded or otherwise suitably secured in the upper portion of the cylinder 5, the spring being compressed upon an upward movement of the piston 10.

The upper end of the steering rod 13 is shaped to provide a hollow vertical shaft 24 of square shape in cross-section and in which an upper shaft section 25 is slidably received, the shaft section extending freely through openings 26 and 27 in the discs 21 and 23 respectively.

The upper end of the shaft section 25 is rounded and journalled in a partition 28 in the upper portion of the cylinder 5, the partition forming a grease chamber 29 in the top of the cylinder. A worm gear 30 is secured to the upper end of the shaft section 25 in the chamber 29 and to which is operatively engaged a worm 31 carried at the front end of a shaft 32 which extends rearwardly of the tractor for operation by the driver. The top of the cylinder 5 is tightly closed by a cap 33 in the underside of which the upper end of the shaft 25 is recessed to provide a bearing therefor.

In the operation of the device, ground shocks subjected to the wheels 15 will cause the vertical movement of the piston 10 and sudden shocks are absorbed by the spring 22. The wheels are steered through the shaft 32 and vertically sliding shaft sections 24 and 25 connected at their upper ends thereto.

The upper portion of the cylinder 5 is provided with check valves 34 and 35 to admit air thereto and to vent air therefrom during reciprocation of the piston to thus prevent vacuum from being created in the cylinder.

The cylinder is adapted to contain a quantity of lubricating oil and the piston is formed with openings 36 to lubricate the cylinder walls and the lower shaft section 24 is formed with vent openings 37.

Conventional hydraulic shock absorbers 38 and 39 may also be attached to the front and rear of the cylinder 5 to take up sudden jolts.

In Figure 5, the invention is shown for use with a single steering front wheel 40 of conventional construction.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

In combination, a shock absorber including a vertical cylinder, a hollow spring biased piston working in the cylinder, a wheel mounting extending downwardly at the lower end of the piston, a vertical steering rod journalled in the mounting, a wheel spindle carried at the lower end of the rod for horizontal swinging movement to steer a wheel mounted thereon, a sectional telescoping shaft extending upwardly from the rod through the piston, a gear housing in the upper end of the cylinder, an operating shaft extending outwardly of the housing, and gears in the housing operatively connecting the upper end of the first named shaft to said second named shaft.

NORMAN N. O. ODEGAARD.

REFERENCES CITED

The following references are of record in the file of this patent:

UNITED STATES PATENTS

| Number | Name | Date |
| --- | --- | --- |
| 591,027 | Wootton | Oct. 5, 1897 |
| 1,239,603 | Kelley | Sept. 11, 1917 |
| 1,711,223 | Burger et al. | Apr. 30, 1929 |
| 1,711,224 | Stockfleth et al. | Apr. 30, 1929 |

FOREIGN PATENTS

| Number | Country | Date |
| --- | --- | --- |
| 457,608 | Great Britain | Dec. 2, 1936 |